UNITED STATES PATENT OFFICE.

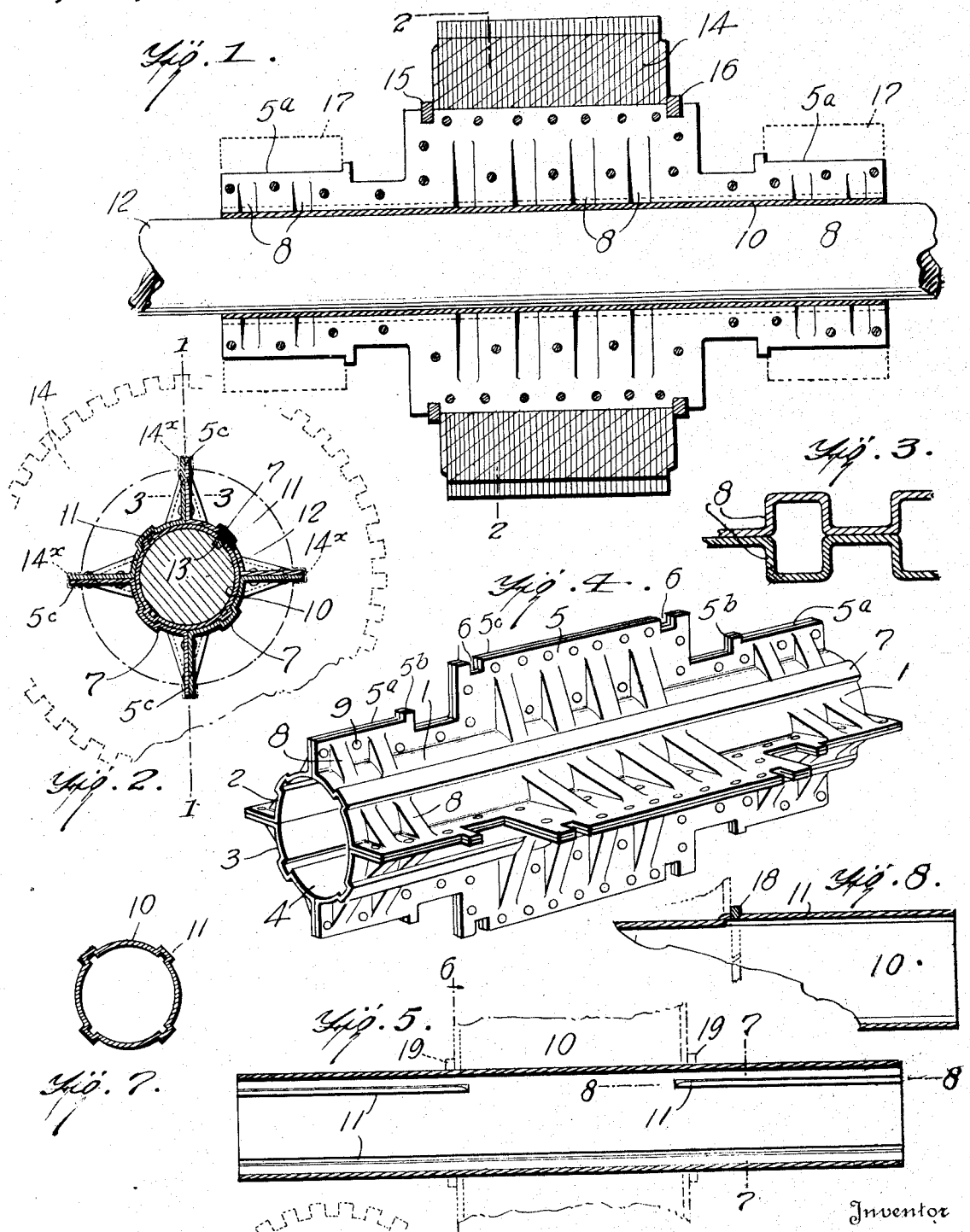

AMATO N. SAMMARONE, OF AKRON, OHIO.

ARMATURE-CORE SUPPORT.

1,279,591.	Specification of Letters Patent.	Patented Sept. 24, 1918.

Application filed May 21, 1917. Serial No. 170,114.

*To all whom it may concern:*

Be it known that I, AMATO N. SAMMARONE, a citizen of the United States, and a resident of Akron, in the county of Summit and State of Ohio, have made certain new and useful Improvements in Armature - Core Supports, of which the following is a specification.

My invention relates to improvements in armature core supports, and it consists in the combinations, constructions and arrangements herein described and claimed.

An object of my invention is to provide an armature core support which is made of pressed steel metal parts secured together in such a manner that a circulation of air is maintained thereby cooling the core.

A further object of my invention is to provide an armature core support which is strong in comparison with its weight.

A further object of my invention is to provide an armature core support which is so formed that the core may be placed on the support or removed therefrom with the greatest facility.

Other objects and advantages will appear in the following specification and the novel features of the invention will be particularly pointed out in the appended claims.

My invention is illustrated in the accompanying drawings forming part of this application, in which:

Figure 1 is a sectional view of one form of the armature core support.

Fig. 2 is a section on the line 2—2 of Fig. 1.

Fig. 3 is a section on the line 3—3 of Fig. 2.

Fig. 4 is a perspective view of the core support.

Fig. 5 is a sectional view of a modified form of the core support.

Fig. 6 is a section on the line 6—6 of Fig. 5.

Fig. 7 is a section on the line 7—7 of Fig. 5, and,

Fig. 8 is a section on the line 8—8 of Fig. 5.

The present application is a continuation in part of a prior application, Serial No. 74247 filed Jan. 25, 1916.

In carrying out my invention I provide a series of stamped metal portions, thus in Fig. 4, 1 denotes in general one of these stamped portions, the other portions being shown at 2, 3 and 4, respectively. It will be observed that the portion 1 has an arc-shaped body portion provided with radially extending flanges 5. These flanges each have a portion $5^a$ at each end, which is parallel with the axis of the core support, and a shoulder $5^b$. It also has a bearing surface $5^c$, there being slots 6 at the ends of the bearing surface. The section 1 has a pressed key-way 7, and is provided with ribs 8 which are pressed from the sheet metal and which stiffen the flanges 5.

There are four of such sections as have been described above that constitute the armature core support in the present instance, these sections being placed with their flanges adjacent to each other, as shown in Fig. 4, and being secured together by means of rivets 9, bolts, welding or in any other suitable manner.

In Fig. 5 I have shown a reinforcing sleeve 10, which consists of a pressed metal tube having stamped key-ways 11 near its ends. This reinforcing tube is designed to immediately surround the shaft 12, being secured thereto by means of keys 13 such as that shown in Fig. 2. The outer portion of the stamped key-ways 11 enter the key-ways 7.

The core consists preferably of laminated sheets 14 secured together in any suitable manner to form a unitary structure. The sheets are provided with cut-away portions $14^x$ arranged to fit over the bearing surfaces $5^c$. It is slipped on over the end of the support and rests on the bearing surface $5^c$, the latter keeping the core from turning. The position of the core is determined by a split ring 15, which may be put in position before the core is slipped on, if it is slipped on from the right hand end, another split ring 16 being sprung into position to hold the core on its support.

The portion $5^a$ forms a bearing for the commutator bars 17 which may be held in any suitable manner. Instead of using the support shown in Fig. 4, I may make use of the sleeve itself. To this end the pressed key-ways 11 are cut to permit the use of spring rings 18 and 19. The laminated plates are slipped on over the sleeve and rest upon the body portion of the sleeve, due to the fact that slots 20 are provided in said laminated plates to receive the pressed key-ways 11. These key-ways form ribs on the outer side of the sleeve which enter the slots 20, as stated, thereby keeping the core from rotating.

It will be seen that I make use of either form of the support or both together. In using the form shown in Fig. 4 alone, the shaft is secured to the support by a key which may enter the pressed key way 7. The core 14 is secured to the support as already described.

I am aware that various modifications might be made, but I consider as my own all such modifications as fairly fall within the spirit and the scope of the invention.

I claim:—

1. An armature core support consisting of a sleeve made up of sections, each section comprising an arc-shaped body portion having radially extending flanges, the flanges of adjacent sections abutting each other, integral brace members extending from said flanges to the curved body portion, means for securing the sections together, an annular core arranged to slip over the radially extending flanges, and means for securing the annular core to the flanges.

2. An armature core support consisting of a sleeve made up of sections, each section comprising an arc-shaped body portion having radially extending flanges, the flanges of adjacent sections abutting each other, means for securing the sections together, an annular core arranged to slip over the radially extending flanges, means for securing the annular core to the flanges, said last named means comprising a split spring ring at each end of the annular core arranged to fit in grooves in the radially extending flanges, and integral braces extending from said flanges to said curved body portion.

3. In an armature core support, a series of stamped sheet metal sections, each section comprising a curved body portion having radially extending flanges at its ends and being provided with pressed braces extending from the flanges to the body portions intermediate of its ends, the radially extending flanges of adjacent sections abutting each other, means for securing said flanges together, said flanges being provided with a series of slots, an annular core arranged to slip over the outer edges of the abutting flanges, and a spring ring at each end of said annular core arranged to fit in said slots for holding said core in position.

4. In an armature core support, a series of stamped sheet metal sections, each section comprising a curved body portion having radially extending flanges at its side and being provided with pressed braces extending from the flanges to the body portions intermediate of its ends, the radially extending flanges of adjacent sections abutting each other, means for securing said flanges together, said flanges being provided with a series of slots, an annular core arranged to slip over the outer edges of the abutting flanges, a spring ring at each end of said annular core arranged to fit in said slots for holding said core in position, and a pressed key-way in one of said sections arranged to receive a key for securing the sleeve to the shaft.

5. An armature core support comprising a sleeve having a series of radially extending flanges, an annular core having grooves arranged to receive the flanges, said flanges extending beyond the ends of the core, integral brace members on both sides of each of said radially extending flanges, and means for securing the core to the flanges, said last named means comprising a split ring at each end of the annular core arranged to fit in the grooves in the radially extending flanges.

AMATO N. SAMMARONE.